United States Patent
Harrison et al.

(10) Patent No.: US 12,432,066 B2
(45) Date of Patent: *Sep. 30, 2025

(54) BLOCKCHAIN-ENHANCED PROOF OF IDENTITY

(71) Applicant: OneSpan Canada Inc., Montreal (CA)

(72) Inventors: Guy Harrison, Kingsville (AU); Michael Harrison, Derrimut (AU); Steven Cedro, Thomastown (AU)

(73) Assignee: OneSpan Canada Inc., Montreal (CA)

( * ) Notice: Subject to any disclaimer, the term of this patent is extended or adjusted under 35 U.S.C. 154(b) by 149 days.

This patent is subject to a terminal disclaimer.

(21) Appl. No.: 18/320,865

(22) Filed: May 19, 2023

(65) Prior Publication Data

US 2023/0299965 A1 Sep. 21, 2023

Related U.S. Application Data

(63) Continuation-in-part of application No. 17/986,455, filed on Nov. 14, 2022, now Pat. No. 11,689,374.

(60) Provisional application No. 63/279,663, filed on Nov. 15, 2021.

(51) Int. Cl.
*H04L 9/40* (2022.01)
*H04L 9/00* (2022.01)
*H04L 9/32* (2006.01)

(52) U.S. Cl.
CPC .......... *H04L 9/3236* (2013.01); *H04L 9/3263* (2013.01); *H04L 9/50* (2022.05)

(58) Field of Classification Search
CPC ........ H04L 9/3236; H04L 9/50; H04L 9/3263
See application file for complete search history.

(56) References Cited

U.S. PATENT DOCUMENTS

| | | | |
|---|---|---|---|
| 9,866,393 B1 * | 1/2018 | Rush | H04L 9/3236 |
| 10,938,562 B2 * | 3/2021 | Liu | H04L 63/08 |
| 11,093,933 B1 * | 8/2021 | Peng | H04L 9/3239 |
| 11,501,365 B1 * | 11/2022 | Awasthy | H04L 63/04 |
| 11,550,931 B1 * | 1/2023 | Dintchev | H04L 63/0428 |

(Continued)

OTHER PUBLICATIONS

S. Fugkeaw "Enabling Trust and Privacy-Preserving e-KYC System Using Blockchain," IEEE Access, vol. 10, pp. 49028-49039, May 12, 2022 (May 12, 2022).

*Primary Examiner* — Ghodrat Jamshidi
(74) *Attorney, Agent, or Firm* — Patterson + Sheridan, LLP

(57) ABSTRACT

In an embodiment, a method of blockchain-enhanced proof of identity (POI) includes receiving identity information of a user in connection with a POI request. The method also includes generating a first cryptographic hash using at least a portion of the identity information and storing the first cryptographic hash on a public blockchain in a first blockchain transaction. The method also includes establishing a request identifier based on the first blockchain transaction. The method also includes receiving a digital image that depicts the user together with a POI document, the digital image including the request identifier. The method also includes creating a POI digital document comprising at least a portion of the digital image. The method also includes generating a second cryptographic hash using at least a portion of the POI digital document and storing the second cryptographic hash on the public blockchain in a second blockchain transaction.

45 Claims, 12 Drawing Sheets

(56) References Cited

U.S. PATENT DOCUMENTS

| | | | |
|---|---|---|---|
| 2018/0005239 A1* | 1/2018 | Schlesinger | G06K 19/06028 |
| 2019/0251526 A1* | 8/2019 | Jackson | G06Q 20/06 |
| 2019/0288854 A1* | 9/2019 | Xie | H04L 9/0891 |
| 2020/0005282 A1* | 1/2020 | Kim | G06Q 20/065 |
| 2020/0007333 A1* | 1/2020 | Young | H04L 9/50 |
| 2020/0143019 A1* | 5/2020 | Chen | H04L 9/0643 |
| 2020/0153630 A1* | 5/2020 | Davis | H04L 9/50 |
| 2020/0169389 A1* | 5/2020 | Zuo | H04L 9/0643 |
| 2021/0135862 A1* | 5/2021 | Morales | H04L 9/50 |
| 2021/0281427 A1* | 9/2021 | Davis | H04L 9/3239 |
| 2024/0112177 A1* | 4/2024 | Maier | G06Q 40/00 |

* cited by examiner

```
"@context": "https://w3id.org/chainpoint/v3",
  "type": "Chainpoint",
  "hash": "60b3b7ca6f619ed9367a819baaaae3aef0995165ac7f3ca02b523a21e92364b5",
  "hash_id_node": "da023c5c-c895-11e9-a32f-2a2ae2dbcce4",
  "hash_submitted_node_at": "2020-05-01T00:48:27Z",
  "hash_id_core": "da023c5c-c895-11e9-a32f-2a2ae2dbcce4",
  "hash_submitted_core_at": "2020-05-01T00:48:27Z",
  "branches": [{
    "label": "pdb_doc_branch",
    "ops": [{
      "l": "e40ff6879ddfc721976596b444359999a47f7fab4f449c9834434b0b70193ece"
    }, {
      "op": "sha-256"
    }, {
      "l": "ce13955716954701775ac49cd520cd6da5b7580ce0ef3ca5e04885398bee84fc"
    }, {
      "op": "sha-256"
    }, {
      "l": "f21b0a07376dc9c11107e672f391326179ebaf0f82f6882021de85875125bca6"
    }, {
      "op": "sha-256"
    }, {
      "l": "c30f96ccdb36c9dd532efe63fc231d3ebc244d7f2c1e974536165dfaa961ad08"
    }, {
      "op": "sha-256"
    }, {
      "l": "63d283b1f5ef045ecb458f24e816d101cee2078343f07e9cfb8eb37fe11a1918"
    }, {
      "op": "sha-256"
    }, {
      "l": "8dfcf03fbc80f5b333f7da26a6127920ffa5a979845450107d522f2f1c0965db"
    }, {
      "op": "sha-256"
    }]
  }, {
    "label": "pdb_eth_anchor_branch",
    "ops": [{
      "anchors": [{
        "type": "cal",
        "anchor_id": "3c0338547fe880ab5d1780d9099e796411db4b3448f2c2243990dafff4271eb1",
        "uris":
["https://anchor.provendb.com/eth/3c0338547fe880ab5d1780d9099e796411db4b3448f2c2243990dafff4271eb1"]
      }]
    }]
  }]
}
```

FIG. 4B

BLOCKCHAIN-ENHANCED PROOF OF IDENTITY

CROSS-REFERENCE TO RELATED APPLICATIONS

This application is a continuation-in-part of U.S. patent application Ser. No. 17/986,455 filed on Nov. 14, 2022, which claims priority to U.S. Provisional Application No. 63/279,663 filed on Nov. 15, 2021. U.S. patent application Ser. No. 17/986,455 and U.S. Provisional Application No. 63/279,663 are hereby incorporated by reference.

BACKGROUND

Technical Field

The present disclosure relates generally to information security and more particularly, but not by way of limitation, to systems and methods for blockchain-enhanced proof of identity.

History of Related Art

Governments around the world are making increasing efforts to combat money laundering and terrorist funding. Artificial intelligence, encryption and cryptocurrency technologies have provided criminals and terrorists with the ability to communicate and to move digital funds anonymously or pseudonymously.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of blockchain-enhanced proof of identity (POI). The method includes receiving identity information of a user in connection with a POI request. The method also includes generating a first cryptographic hash using at least a portion of the identity information. The method also includes storing the first cryptographic hash on a public blockchain in a first blockchain transaction. The method also includes establishing a request identifier for the POI request based on an identifier for the first blockchain transaction. The method also includes receiving a digital image that depicts the user together with a POI document, the digital image including the request identifier. The method also includes, responsive to successful validation of at least selected information in the digital image, creating a POI digital document comprising at least a portion of the digital image. The method also includes generating a second cryptographic hash using at least a portion of the POI digital document. The method also includes storing the second cryptographic hash on the public blockchain in a second blockchain transaction.

In an embodiment, another general aspect includes a method of blockchain-enhanced proof of identity (POI). The method may include receiving identity information of a user in connection with a POI request. The method includes obtaining an identifier of a first blockchain transaction on a first blockchain. The method also includes establishing a request identifier for the POI request based on an identifier for the first blockchain transaction. The method also includes receiving an anchored credential of the user, wherein the anchored credential is a function of the request identifier and provides verifiable proof of the identity of the user. The method may further comprise validating the anchored credential. The method also includes, for example responsive to said validating of the anchored credential being successful, creating a POI digital document comprising at least a portion of the anchored credential. The method also includes storing a representation of the POI digital document on a second public blockchain in a second blockchain transaction.

In an embodiment, another general aspect includes a computer system having a processor, persistent storage, and memory. The processor and the memory in combination are operable to implement a method blockchain-enhanced proof of identity (POI). The method includes receiving identity information of a user in connection with a POI request. The method also includes generating a first cryptographic hash using at least a portion of the identity information. The method also includes storing the first cryptographic hash on a public blockchain in a first blockchain transaction. The method also includes establishing a request identifier for the POI request based on an identifier for the first blockchain transaction. The method also includes receiving a digital image that depicts the user together with a POI document, the digital image including the request identifier. The method also includes, responsive to successful validation of at least selected information in the digital image, creating a POI digital document comprising at least a portion of the digital image. The method also includes generating a second cryptographic hash using at least a portion of the POI digital document. The method also includes storing the second cryptographic hash on the public blockchain in a second blockchain transaction.

In an embodiment, in another general aspect, a computer-program product includes a non-transitory computer-usable medium having computer-readable program code embodied therein. The computer-readable program code is adapted to be executed to implement a method of blockchain-enhanced proof of identity (POI). The method includes receiving identity information of a user in connection with a POI request. The method also includes generating a first cryptographic hash using at least a portion of the identity information. The method also includes storing the first cryptographic hash on a public blockchain in a first blockchain transaction. The method also includes establishing a request identifier for the POI request based on an identifier for the first blockchain transaction. The method also includes receiving a digital image that depicts the user together with a POI document, the digital image including the request identifier. The method also includes, responsive to successful validation of at least selected information in the digital image, creating a POI digital document comprising at least a portion of the digital image. The method also includes generating a second cryptographic hash using at least a portion of the POI digital document. The method also includes storing the second cryptographic hash on the public blockchain in a second blockchain transaction.

EXEMPLARY EMBODIMENTS

One general aspect of the invention includes a method of blockchain-enhanced proof of identity (POI). The method (more in particular, any of the following embodiments of the method) may be performed by a system such as any of the systems or computer systems discussed elsewhere in this description.

In a first set of embodiment of the method, the method includes receiving identity information of a user in connection with a POI request. The method also includes obtaining an identifier for a first blockchain transaction on a first blockchain or for a block of the first blockchain comprising such a first blockchain transaction. The method also includes establishing a request identifier for the POI request based on the identifier for the first blockchain transaction on a first blockchain or for a block of the first blockchain comprising the first blockchain transaction. The method also includes receiving an anchored credential of the user, wherein the anchored credential is a function of the request identifier and provides verifiable proof of the identity of the user. The method also includes, for example responsive to successful validation of the anchored credential, creating a POI digital document comprising at least a portion of the anchored credential. The method also includes storing a representation of the POI digital document on a second blockchain in a second blockchain transaction.

In a second set of embodiments of the method, the method may include any embodiment of the first set of embodiments wherein the first blockchain and the second blockchain are public blockchains.

In a third set of embodiments of the method, the method may include any embodiment of the first to second embodiments of the method wherein the first blockchain and the second blockchain are the same blockchain. In a fourth set of embodiments of the method, the method may include any embodiment of the first to second embodiments of the method wherein the first blockchain and the second blockchain are different blockchains.

Using an existing blockchain transaction versus creating a new blockchain transaction. In an fifth set of embodiments, the method may include any embodiment of the first to fourth set of embodiments of the method, wherein said first blockchain transaction is an existing transaction on said first blockchain. In a sixth set of embodiments, the method may include any embodiment of the first to fourth set of embodiments of the method, further including adding said first blockchain transaction to said first blockchain. In a seventh set of embodiments, the method may include any embodiment of the sixth set of embodiments, wherein adding said first blockchain transaction to said first blockchain includes storing a first set of data on the first blockchain in said first blockchain transaction. The first set of data may comprise a first blockchain anchor as discussed in more detail elsewhere in this description. In an eighth set of embodiments, the method may include any embodiment of the seventh set of embodiments, wherein said first set of data includes data related to or comprising a portion of the identity information. In a ninth set of embodiments, the method may include any embodiment of the seventh or eighth set of embodiments, further comprising generating a first cryptographic hash using at least a portion of the identity information and wherein said first set of data includes the first cryptographic hash.

Said identifier of a first blockchain transaction on a first blockchain or of a block of the first blockchain comprising such a first blockchain transaction may comprise any data element the value of which can be used to identify with a very high degree of certainty that first blockchain transaction or the block comprising that first blockchain transaction. In a 10th set of embodiments, the method may include any embodiment of the first to ninth set of embodiments of the method wherein obtaining an identifier of a first blockchain transaction on a first blockchain or of a block of the first blockchain comprising such a first blockchain transaction is done in a way such that the probability that another blockchain transaction or another block has the same identifier value is less than a certain given threshold, for example, less than 1 in a million or less than 1 in 100 million. For example, in some embodiments the identifier may comprise or may be a function of a cryptographic hash of the block comprising the first blockchain transaction. In an 11th set of embodiments, the method may include any embodiment of the first to 10th set of embodiments of the method wherein the identifier is unique for different blockchain transactions or for different blockchain blocks and the probability that another blockchain transaction or another block has the same identifier value is zero. In a 12th set of embodiments, the method may include any embodiment of the first to 11th set of embodiments of the method wherein the value of the identifier of a first blockchain transaction on a first blockchain or of a block of the first blockchain comprising such a first blockchain transaction is unpredictable before the first blockchain transaction is stored on the first blockchain and/or before the block of the first blockchain comprising the first blockchain transaction is created and/or added to the first blockchain.

Validation. In a 13th set of embodiments of the method, the method may include any embodiment of the first to 12th set of embodiments of the method further including validating the anchored credential. In a 14th set of embodiments, the method may include any embodiment of the 13th set of embodiments of the method wherein the creating a POI digital document comprising at least a portion of the anchored credential and/or the storing a representation of the POI digital document on a second blockchain in a second blockchain transaction is responsive to said validating of the anchored credential being successful, In some embodiments, the method may include any embodiment of the 13th set of embodiments of the method wherein the step of creating a POI digital document comprising at least a portion of the anchored credential and/or the step of storing a representation of the POI digital document on a second blockchain in a second blockchain transaction happens only if said validating of the anchored credential is successful. In a 15th set of embodiments, the method may include any embodiment of the 13th set of embodiments of the method wherein the POI digital document further comprises data representative of a result of said validating the anchored credential.

In a 16th set of embodiments of the method, the method may include any embodiment of the first to 15th set of embodiments of the method wherein storing a representation of the POI digital document on the second blockchain in a second blockchain transaction comprises generating a second cryptographic hash using at least a portion of the POI digital document and storing the second cryptographic hash on the second blockchain in the second blockchain transaction.

Anchored Credential. In a 17th set of embodiments of the method, the method may include any embodiment of the first to 16th set of embodiments of the method wherein the anchored credential is a function of the request identifier in such a way that it is hard to generate, without the cooperation of the user, an anchored credential for a given value of the request identifier that can be validated successfully (i.e., it is hard to fraudulently forge an anchored credential that is supposed to correspond to a given value of the request identifier whereby that fraudulently forged anchored credential successfully passes validation).

In an 18th set of embodiments of the method, the method may include any embodiment of the first to 17th set of embodiments of the method wherein the anchored credential comprises a digital visual representation of the user together with a POI document (e.g., physical POI document) and a representation of the request identifier. In a 19th set of embodiments of the method, the method may include any embodiment of the first to 18th set of embodiments of the method wherein the anchored credential comprises a digital image that depicts the user together with a POI document, the digital image further including the request identifier.

In a 20th set of embodiments of the method, the method may include any embodiment of the first to 19th set of embodiments of the method wherein the anchored credential comprises a digital image of the user holding the POI document (e.g., physical POI document) and holding a visual representation of the request identifier (such as in FIG. 3D). In a 21st set of embodiments of the method, the method may include any embodiment of the 18th set of embodiments of the method wherein the anchored credential comprises a digital movie of the user holding the POI document (e.g., physical POI document) and holding a visual representation of the request identifier and/or reading out a representation of the request identifier (e.g., an alphanumeric representation).

In a 22nd set of embodiments of the method, the method may include any embodiment of the 18th to 21st sets of embodiments of the method wherein said validating the anchored credential comprises extracting from the anchored credential a picture of the user on the POI document (e.g., physical POI document) and comparing the extracted picture of the user with the digital visual representation of the user in the anchored credential, and/or comprises extracting a request identifier test value from the representation of the request identifier in the anchored credential and comparing the extracted request identifier test value with a value of the request identifier established in the establishing a request identifier for the POI request based on an identifier for the first blockchain transaction, and/or comprises extracting a second set of identity information from the POI document (e.g., physical POI document) in said digital visual representation of the user together with a POI document (e.g., physical POI document) and comparing the extracted second set of identity information with the identity information received in the receiving identity information of a user in connection with a POI request, and/or comprises a liveness detection of said digital visual representation of the user together with a POI document (e.g., physical POI document) and a representation of the request identifier.

In a 23rd set of embodiments of the method, the method may include any embodiment of the 18th to 22nd sets of embodiments of the method comprising presenting the user with the request identifier; and wherein the digital visual representation (such as for example a digital image or digital movie) includes the request identifier via depiction of the user together with the request identifier and the POI document. In a 24th set of embodiments of the method, the method may include any embodiment of the 18th to 22nd sets of embodiments of the method wherein the digital visual representation (such as for example a digital image or digital movie) includes the request identifier via steganographic embedding thereof.

In a 25th set of embodiments of the method, the method may include any embodiment of the first to 24th sets of embodiments of the method wherein the anchored credential comprises a digital signature of the request identifier wherein the digital signature is created using a secret or private key linked to or controlled by the user. In a 26th set of embodiments of the method, the method may include any embodiment of the 25th set of embodiments of the method wherein the secret or private key linked to or controlled by the user comprises a private key of a public/private key pair whereby a public key of that public/private key pair is certified by a certificate that may be issued by a trusted party (such as a government institution) and whereby that certificate links the public key to identity information of the user. For example, in some embodiments the digital signature can be created by an electronic identity card of the user that may be issued by a trusted institution (for example a government institution) whereby the electronic identity card may create the digital signature using a private key of a public/private key pair associated with the user and certified by the government institution and stored on the electronic identity card.

In a 27th set of embodiments of the method, the method may include any embodiment of the first to 26th sets of embodiments of the method, further comprising generating an identity proof that certifies creation of the POI digital document between a time of the first blockchain transaction and a time of the second blockchain transaction.

In a 28th set of embodiments of the method, the method may include any embodiment of the 27th set of embodiments of the method, further comprising associating a shareable uniform resource locator (URL) with the identity proof, wherein the shareable URL translates to a page that shows at least a portion of the identity proof.

In a 29th set of embodiments of the method, the method may include any embodiment of the 27th or 28th sets of embodiments of the method, further comprising creating a non-fungible token associated with the POI request and transferring the NFT to a cryptocurrency account of an individual requesting the identity proof.

In a 30th set of embodiments of the method, the method may include any embodiment of the first to 29th sets of embodiments of the method, wherein the creating the POI digital document comprises digitally signing the request identifier and embedding the digitally signed request identifier into the POI digital document.

In a 31st set of embodiments of the method, the method may include any embodiment of the first to 30th sets of embodiments of the method comprising generating a first cryptographic hash using at least a portion of the identity information and storing the first cryptographic hash on the first blockchain in the first blockchain transaction, and/or comprising generating a second cryptographic hash using at least a portion of the POI digital document and storing the second cryptographic hash on the second blockchain in the second blockchain transaction.

In a 32nd set of embodiments of the method, the method may include any embodiment of the 31st set of embodiments of the method, wherein: the generating the first cryptographic hash comprises hashing a first identity dataset comprising at least a portion of the identity information, the stored first cryptographic hash comprising the hashed first identity dataset; and/or the generating the second cryptographic hash comprises hashing a second identity dataset comprising the at least a portion of the POI digital document, the stored second cryptographic hash comprising the hashed second identity dataset.

In a 33rd set of embodiments of the method, the method may include any embodiment of the 31st set of embodiments of the method, wherein: the generating the first cryptographic hash comprises: hashing a first identity dataset comprising at least a portion of the identity information and constructing a first Merkle tree at least partly from the hashed first identity dataset, the stored first cryptographic hash comprising a root hash of the first Merkle tree; and/or the generating the second cryptographic hash comprises: hashing a second identity dataset comprising the at least a portion of the POI digital document and constructing a second Merkle tree at least partly from the hashed second identity dataset, the stored second cryptographic hash comprising a root hash of the second Merkle tree.

In a 34th set of embodiments of the method, the method may include any embodiment of the 33rd set of embodiments of the method, wherein: the first Merkle tree comprises a first batch Merkle tree, the constructing the first Merkle tree comprising hashing data related to multiple POI requests; and/or the second Merkle tree comprises a second batch Merkle tree, the constructing the second Merkle tree comprising hashing data related to multiple POI requests.

In a 35th set of embodiments of the method, the method may include any embodiment of the 33rd set of embodiments of the method, comprising: storing first Merkle path information for at least one node of the first Merkle tree, the first Merkle path information comprising information related to a sequence of hashes that connect the at least one node with the root hash of the first Merkle tree; and/or storing second Merkle path information for at least one node of the second Merkle tree, the Merkle path information comprising information related to a sequence of hashes that connect the at least one node with the root hash of the second Merkle tree.

In a 36th set of embodiments of the method, the method may include any embodiment of the first to 35th sets of embodiments of the method, wherein the request identifier comprises at least a portion of the identifier for the first blockchain transaction on the first blockchain or for a block of the first blockchain comprising the first blockchain transaction.

Another general aspect of the invention includes a computer system comprising a processor, persistent storage and memory, which in combination are operable to implement a method of blockchain-enhanced proof of identity (POI).

In a first set of embodiments of the computer system, the computer system comprises a processor, persistent storage and memory, which in combination are operable to implement any of the methods of blockchain-enhanced proof of identity (POI) discussed elsewhere in this description, in particular any embodiment of any of the sets of embodiments of the method of blockchain-enhanced proof of identity (POI) discussed in the preceding paragraphs.

In a second set of embodiments of the computer system, the computer system comprises any of the computer systems of the first set of embodiments of the computer system, wherein the method further comprises: receiving identity information of a user in connection with a POI request; generating a first cryptographic hash using at least a portion of the identity information; storing the first cryptographic hash on a public blockchain in a first blockchain transaction; establishing a request identifier for the POI request based on an identifier for the first blockchain transaction; receiving a digital image that depicts the user together with a POI document, the digital image including the request identifier; responsive to successful validation of at least selected information in the digital image, creating a POI digital document comprising at least a portion of the digital image; generating a second cryptographic hash using at least a portion of the POI digital document; and storing the second cryptographic hash on the public blockchain in a second blockchain transaction.

In a third set of embodiments of the computer system, the computer system comprises any of the computer systems of the first or second sets of embodiments of the computer system, wherein the computer system is a distributed computer system that is implemented via a plurality of services.

In a fourth set of embodiments of the computer system, the computer system comprises any of the computer systems of the first to third sets of embodiments of the computer system, wherein the method further comprises generating an identity proof that certifies creation of the POI digital document between a time of the first blockchain transaction and a time of the second blockchain transaction.

In a fifth set of embodiments of the computer system, the computer system comprises any of the computer systems of the first to fourth sets of embodiments of the computer system, wherein the creating the POI digital document comprises: digitally signing the request identifier; and embedding the digitally signed request identifier into the POI digital document.

In a sixth set of embodiments of the computer system, the computer system comprises any of the computer systems of the second set of embodiments of the computer system, wherein: the generating the first cryptographic hash comprises hashing a first identity dataset comprising at least a portion of the identity information, the stored first cryptographic hash comprising the hashed first identity dataset; and/or the generating the second cryptographic hash comprises hashing a second identity dataset comprising the at least a portion of the POI digital document, the stored second cryptographic hash comprising the hashed second identity dataset.

In a seventh set of embodiments of the computer system, the computer system comprises any of the computer systems of the second set of embodiments of the computer system, wherein the generating the first cryptographic hash comprises: hashing a first identity dataset comprising at least a portion of the identity information; and constructing a first Merkle tree at least partly from the hashed first identity dataset, the stored first cryptographic hash comprising a root hash of the first Merkle tree; and/or the generating the second cryptographic hash comprises: hashing a second identity dataset comprising the at least a portion of the POI digital document; and constructing a second Merkle tree at least partly from the hashed second identity dataset, the stored second cryptographic hash comprising a root hash of the second Merkle tree.

In an eighth set of embodiments of the computer system, the computer system comprises any of the computer systems of the seventh set of embodiments of the computer system, the method comprising: wherein the first Merkle tree is a first batch Merkle tree, the constructing the first Merkle tree comprising hashing data related to multiple POI requests; wherein the second Merkle tree is a second batch Merkle tree, the constructing the second Merkle tree comprising hashing data related to multiple POI requests; storing first Merkle path information for at least one node of the first Merkle tree, the first Merkle path information comprising information related to a sequence of hashes that connect the at least one node with the root hash of the first Merkle tree; and storing second Merkle path information for at least one node of the second Merkle tree, the Merkle path information comprising information related to a sequence of hashes that connect the at least one node with the root hash of the second Merkle tree.

Another general aspect of the invention includes a computer-program product comprising a non-transitory computer-usable medium having computer-readable program code embodied therein, the computer-readable program code adapted to be executed to implement a method of blockchain-enhanced proof of identity (POI).

In a first set of embodiments of this computer-program product, the computer-readable program code is adapted to be executed to implement any of the methods of blockchain-enhanced proof of identity (POI) discussed elsewhere in this description, in particular any embodiment of any of the sets of embodiments of the method of blockchain-enhanced proof of identity (POI) discussed in the preceding paragraphs.

In a second set of embodiments of this computer-program product, the product may comprise the product of any embodiment of the first set of embodiments, wherein the method of blockchain-enhanced proof of identity (POI) comprises: receiving identity information of a user in connection with a POI request; generating a first cryptographic hash using at least a portion of the identity information; storing the first cryptographic hash on a public blockchain in a first blockchain transaction; establishing a request identifier for the POI request based on an identifier for the first blockchain transaction; receiving a digital image that depicts the user together with a POI document, the digital image including the request identifier; responsive to successful validation of at least selected information in the digital image, creating a POI digital document comprising at least a portion of the digital image; generating a second cryptographic hash using at least a portion of the POI digital document; and storing the second cryptographic hash on the public blockchain in a second blockchain transaction.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 4B illustrates an example of identity proof data that includes Merkle path information;

DETAILED DESCRIPTION

Figure 1A:
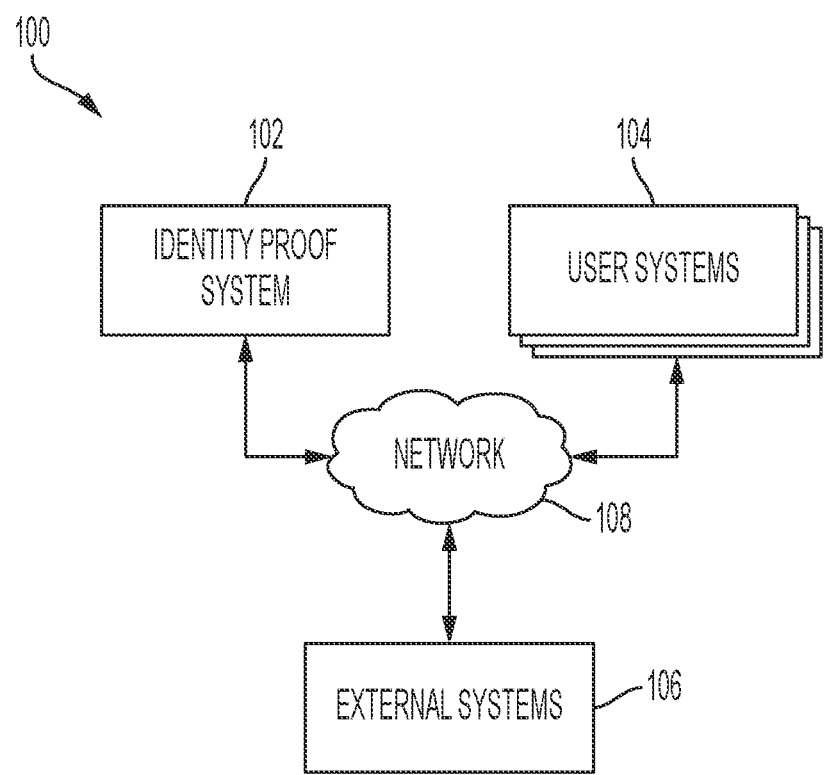
FIG. 1A illustrates an example of a system for implementing an identity proof system.

A pillar of Anti Money Laundering (AML) and Counter-Terrorist Funding (CTF) compliance is a rigorous Know Your Customer (KYC) program. When customers are onboarded to financial service providers or elsewhere, they are expected to provide validated Proof of Identity (POI). Nowhere is this POI more important than in the context of cryptocurrency exchanges. The ability to detect the movement of funds from anonymous cryptocurrencies, such as Bitcoin, to fiat currencies, is arguably one of the most significant AML and CTF objectives.

In an effort to implement a rigorous POI KYC solution, one approach enterprises might employ is the use of validation technology when onboarding new customers. For example, a user may be required to provide some form of digital representation of a government-issued ID, such as a passport or a driver's license. This information might be combined with a real-time photograph of the user. One or more of the following validation technologies may be used to validate these digital items.

For example, optical character recognition (OCR) can be used to extract key elements from a presented POI documentation and compare them to the user's claimed identity. For instance, a passport may be scanned for name, date of birth, passport number, etc.

As another example, facial recognition can be used to compare a photograph on a government-issued identification with the real-time photograph of the user. While this technique may become increasingly viable over time, photographs on government identifications, such as driver's licenses, often have insufficient resolution to enable a perfect match.

As another example, liveliness detection can be used to validate that a photographic input has come from a live human being rather than from a facsimile or "spoof." This can prevent a rogue actor from simply submitting a photograph of a photograph. Artificial intelligence algorithms can be used to determine if the camera is really taking a photograph of a live human being by looking for blinks, for example, using inbuilt augmented reality capabilities of smartphones and so on.

As another example, police and/or government databases can be consulted. KYC systems may check with such police and/or government databases via published application programming interfaces (APIs) to ensure that the document is valid and trustworthy.

Another example of validation technology that can be employed is a "selfie" with POI and proof of date. KYC systems, for example, could request that the user take a photograph of themselves together with the POI document and sometimes with a system-generated code. This photograph is meant to ensure that the owner of the identity documents is the person submitting the documents, and the code is used to ensure that such proofs cannot be reused in altered contexts.

While the above validation technologies may contribute to a robust KYC capability, there are various weaknesses. For example, although a "selfie" with a POI document may be better than separate photographs of the user and the document, the "proof" of date or context typically cannot be independently validated. The photograph may attest to a creation date, but there is no independent corroboration of that date. Furthermore, while the code provided in the "selfie" helps establish the date of the photograph, there is nothing stopping such preferred entity documentation from being created after-the-fact. A regulator seeking to validate that an enterprise had performed sufficient KYC measures would have no means of independently validating the date of the document.

In various embodiments, an advantageous use of blockchain as described herein can overcome the above weaknesses. By servicing as the foundation for cryptocurrencies such as bitcoin, blockchain is arguably one of the technological drivers leading to increasing challenges in AML and CTF. The present disclosure describes examples of how blockchain can also serve as an important mechanism for increasing the robustness of KYC systems and for reducing the compliance costs of AML and CTF. The present disclosure outlines an example architecture for a blockchain-enhanced KYC system that supports these objectives.

In various embodiments, an identity proof system can integrate with validation technologies such as those described above, such as liveliness detection, government API lookups, facial recognition, and OCR. In various embodiments, certain advantageous capabilities of the identity proof system are based on blockchain-anchoring of document data or metadata both before and after the creation of a POI artifact. In this way, in various embodiments, the example solution outlined in this disclosure can leverage blockchain technology to prove, economically and definitively, the origin date of POI documents. This proof can prevent backdating of or undetected tampering with the documents and can allow both the original date and integrity of the documents to be definitively determined. Examples will be described relative to the Drawings.

FIG. 1A illustrates an example of a system 100 for implementing an identity proof system 102. The system 100 includes the identity proof system 102, one or more user systems 104, and one or more external systems 106, each of which is operable to communicate over a network 106. The network 106 may be, or may include, one or more of a private network, a public network, a local or wide area network, a portion of the Internet, combinations of the same, and/or the like. Example operation of the identity proof system 102 will be described in greater detail relative to FIG. 1B.

The external systems 106 can include any system with which the identity proof system 102 is operable to communicate to achieve its functionality. For example, the external systems 106 can include systems providing or implementing validation technologies such as those described previously. It should be appreciated, however, that in various embodiments, the identity proof system 102 can implement some or all such validation functionality internally. As another example, the external systems 106 can include blockchain systems that provide access to a public or private blockchain.

In certain embodiments, features of the components of identity proof system 102 can be made accessible over an interface to the user systems 104. The user systems 104 can include any type or combination of computing device, including desktops, laptops, tablets, smartphones, and wearable or body-borne computers such as smartwatches or fitness trackers, to name a few. The user systems 104 can be operated by users, such as customers to be onboarded, or by other users, for example, for administration purposes.

Figure 1B:
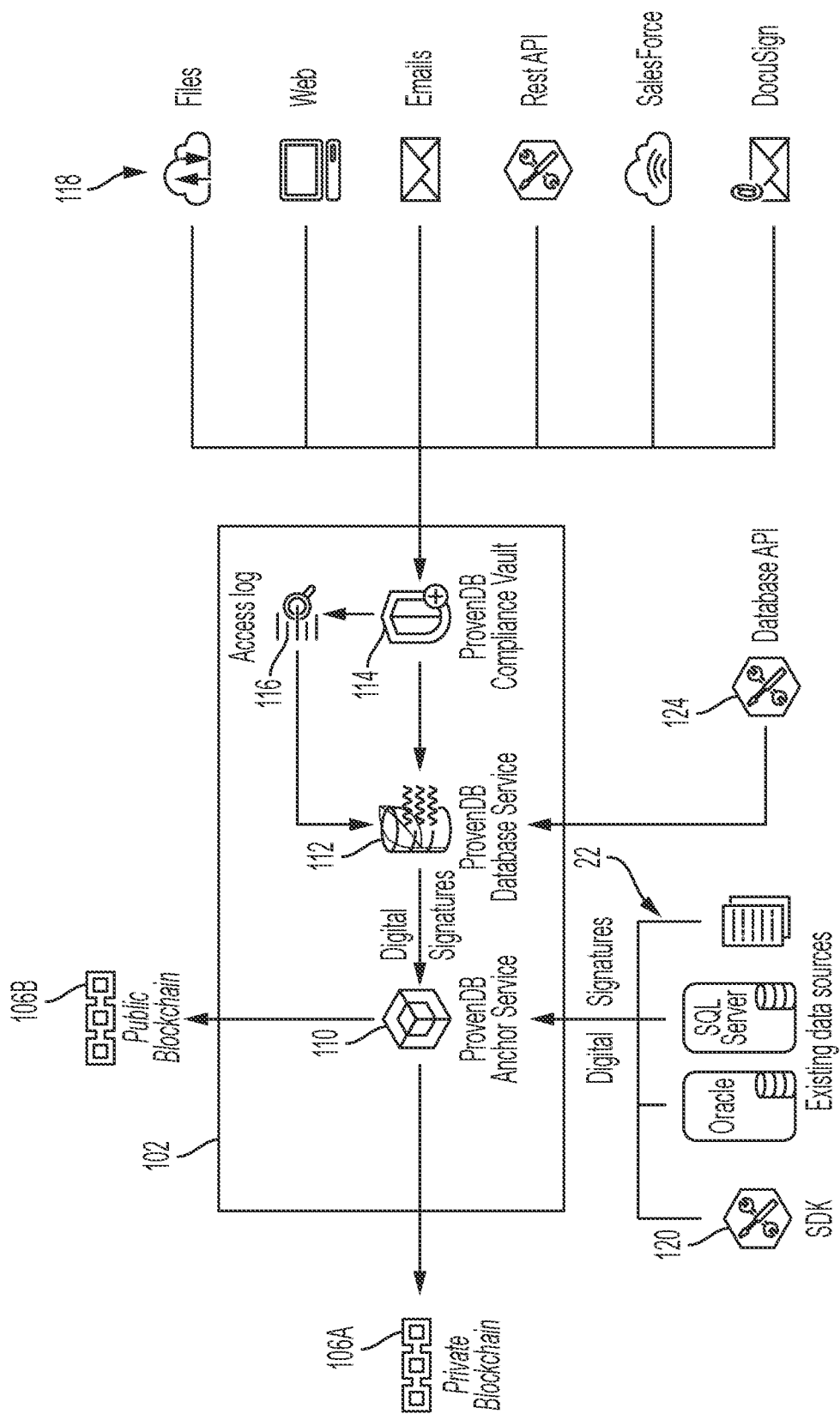
FIG. 1B illustrates an example of an identity proof system.

FIG. 1B illustrates an example of the identity proof system 102. In the illustrated embodiment, the identity proof system 102 includes an anchor service 110, a database service 112, a compliance vault 114, and an access log 116. Each of these components can be implemented with hardware and/or software, including (optionally) virtual machines and containers. In an example, the identity proof system 102 can be implemented as a single management server. In another example, identity proof system 102 can be implemented in a plurality of virtual or physical servers, which may or may not be geographically co-located. In some embodiments, the identity proof system 102 may be hosted on a cloud-provider system. It should be appreciated, however, that the arrangement shown in FIG. 1B is only presented for illustrative purposes. After a thorough review of the present disclosure, one skilled in the art will appreciate that similar functionality can be distributed to any suitable number or arrangement of components.

The database service 112 is operable to configurably store data received, used, or generated by the identity proof system 102. The database service 112 can provide a database API 124 for purposes of accessing, retrieving, or manipulating the data stored thereby. In the illustrated embodiment, the database service 112 can store and maintain, for example, the compliance vault 114 and the access log 116 associated therewith. The compliance vault 114 can include a configurable set of compliance-relevant information in correspondence to a given organization's information governance policy. As illustrated, the compliance-relevant information stored in the compliance vault 114 can result from heterogenous information sources 118 that may be available to an organization. In a typical embodiment, the database service 112 updates the access log 116 to track each access to information in the compliance vault 114.

The anchor service 110 can receive data, such as digital signatures, from the database service 112 and/or from various existing data sources 122 utilized by the identity proof system 102. The anchor service 110 can also post data, for example, to a private blockchain 106A and/or a public blockchain 106B such as Ethereum or Hedera Hashgraph. In some embodiments, as shown, the anchor service 110 can advantageously integrate various software development kits (SDKs) 120 to provide certain of its functionality, such as validation functionality in some embodiments. Example operation of the identity proof system 102 will be described in greater detail relative to FIG. 2.

Figure 2:
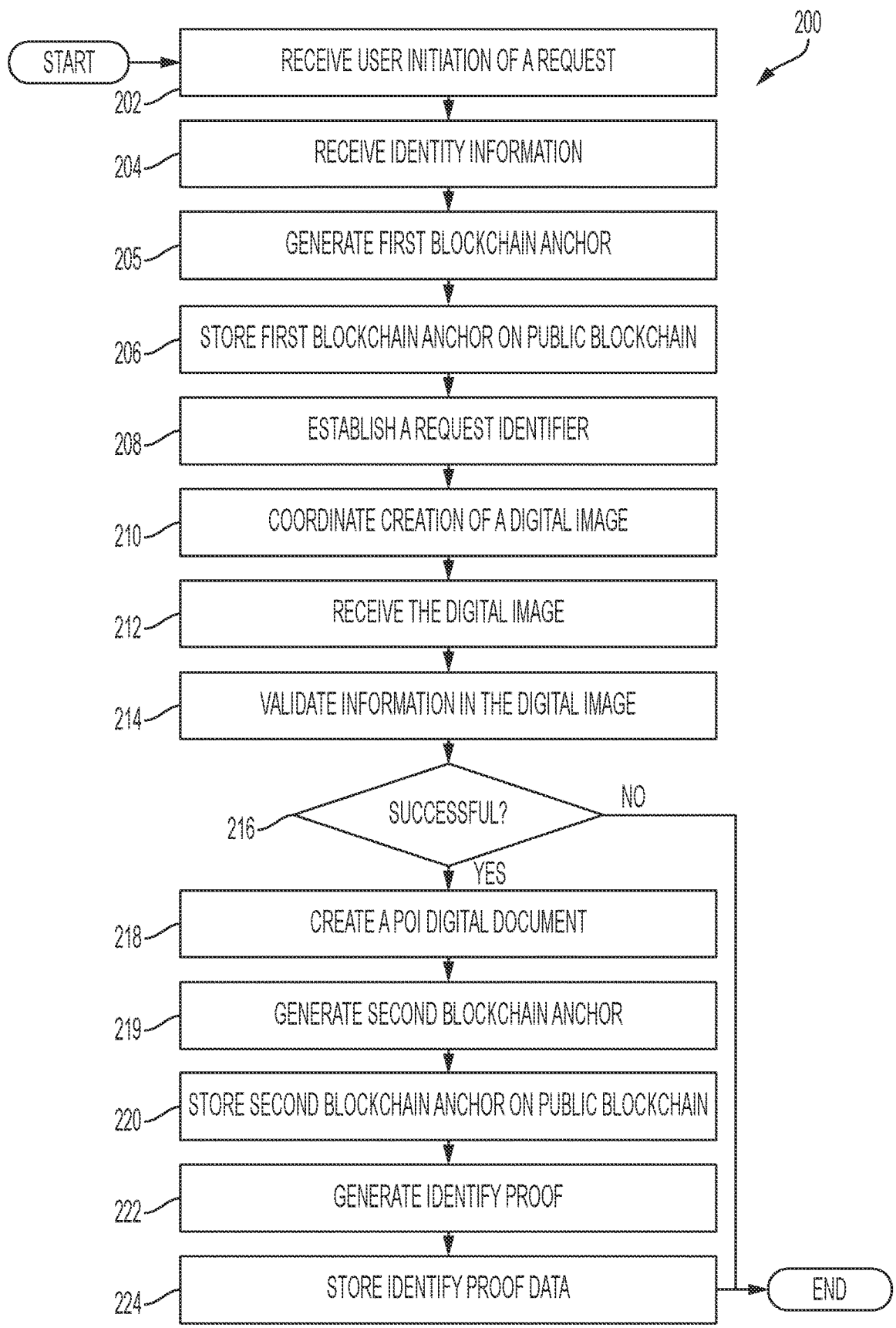
FIG. 2 illustrates an example of a process for blockchain-enhanced proof of identity (POI)

FIG. 2 illustrates an example of a process 200 for blockchain-enhanced POI. In certain embodiments, the process 200 can be implemented by any system that can process data. Although any number of systems, in whole or in part, can implement the process 200, to simplify discussion, the process 200 will be described generally relative to the identity proof system 102 of FIGS. 1A-B.

Figure 3A:
FIG. 3A illustrates an example of an interface that can be provided to a user for initiating a POI request.

At block 202, the identity proof system 102 receives, e.g. from a user, an initiation of a POI request. In various embodiments, the user can be operating one of the user systems 104 of FIG. 1A. FIG. 3A shows an example of an interface that the identity proof system 102 can provide to the user for purposes of initiating the POI request.

Figure 3B:
FIG. 3B illustrates an example of an interface that can facilitate entry of identity information.

At block 204, the identity proof system 102 receives identity information of the user in connection with the POI request that was initiated at the block 202. The identity information can include, for example, a name, date of birth, address, document identifier and/or the like. FIG. 3B shows an example of an interface that the identity proof system 102 can provide to the user to facilitate entry of at least a portion of the identity information.

At block 205, the identity proof system 102 generates a first blockchain anchor using the identity information of the user. The first blockchain anchor can represent, and/or attest to, at least a portion of the identity information of the user and/or other data or metadata related to the POI request, such as a date and/or time. In some embodiments, the first blockchain anchor can be or can comprise a cryptographic hash that is generated using SHA256 or another suitable hashing algorithm wherein the cryptographic hash may be a function of the received identity information of the user. Examples of the cryptographic hash will be described below.

Figure 4A:
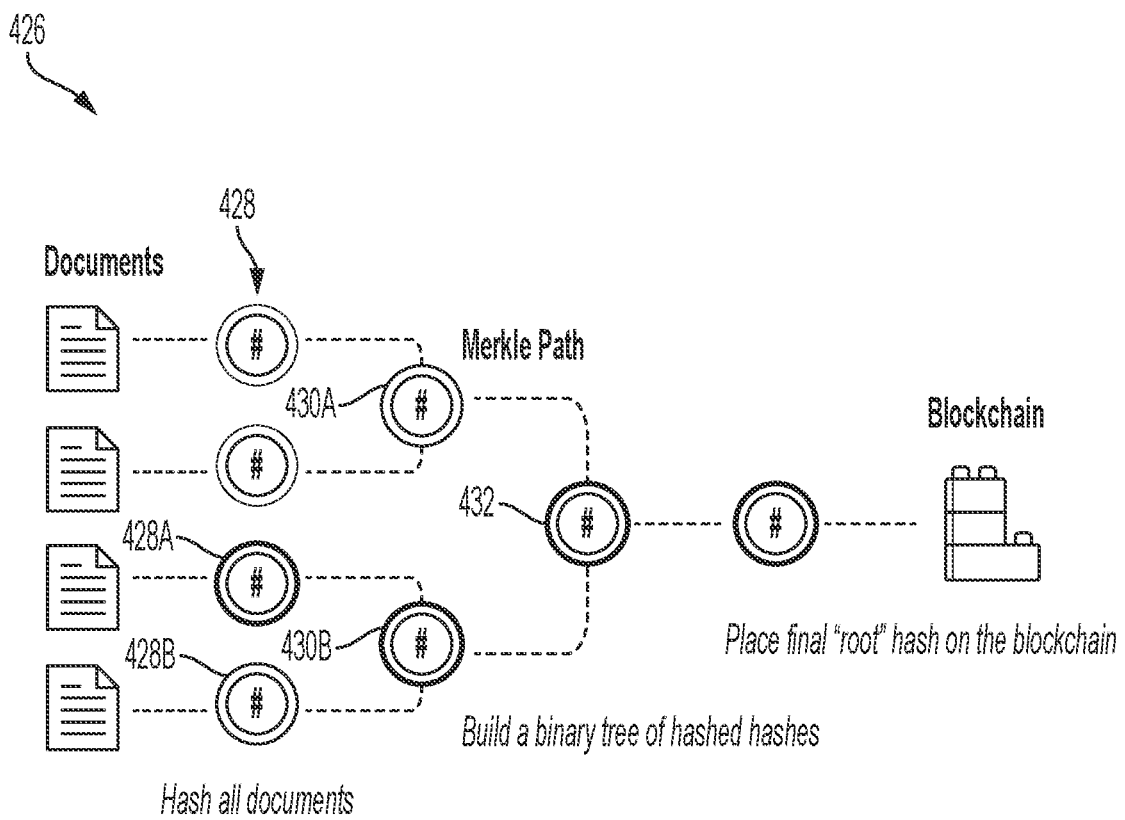
FIG. 4A illustrates an example of a Merkle tree.

For example, in some cases, the cryptographic hash can result from hashing a first configurable identity dataset, whereby the cryptographic hash may be the result of applying a cryptographic hashing algorithm (such as for example an algorithm of the SHA family of cryptographic hashing algorithms) to the first configurable identity dataset. The first configurable identity dataset can include, for example, the identity information from the block 204, any subset and/or transformation of such identity information, and/or any other data or metadata related to the POI request, such as a date and/or time. In other cases, additional hashing can be performed to generate the cryptographic hash. For example, the cryptographic hash can be a root of a Merkle tree, thereby resulting from a sequence of hashes. Example embodiments involving Merkle trees will be described in greater detail relative to FIGS. 4A, 4B, and 5.

At block 206, the identity proof system 102 stores the first blockchain anchor on a public blockchain in a first blockchain transaction. For example, if the first blockchain anchor is a cryptographic hash as described relative to the block 205, the block 206 can include storing that cryptographic hash on the public blockchain. The public blockchain can be, for example, the public blockchain 106B of FIG. 1B.

At block 208, the identity proof system 102 establishes a request identifier for the POI request. In certain embodiments, the request identifier is based on a unique identifier for the first blockchain transaction. In some cases, the request identifier is, or includes, all or a portion of the unique identifier for the first blockchain transaction. In addition, or alternatively, the request identifier can be derived from the unique identifier for the first blockchain transaction. Other examples of the request identifier will be apparent to one skilled in the art after a detailed review of the present disclosure.

Figure 3C:
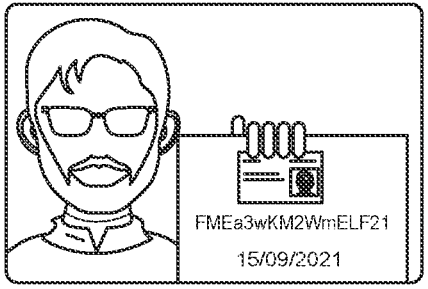
FIG. 3C illustrates an example prompt for submitting a digital image.

At block 210, the identity proof system 102 coordinates creation of a digital image that visually depicts the user together with suitable information for validation, such as a POI document, a date and/or other information. The digital image also includes the request identifier. In some embodiments, the identity proof system 102 interacts with a device of the user, such as given user system of the user systems 104 of FIG. 1A, to cause the digital image to be taken and sent. In other embodiments, the user takes and submits the digital image in response to a prompt. FIG. 3C illustrates an example of an interface that can be provided to the user as a prompt for submitting the digital image.

Still with reference to the block 210, in various embodiments, the POI document can be a driver's license, passport, national identity card, or other document that suitably attests to identity. For example, the digital image can depict the user holding the POI document along with any other information for validation. In some embodiments, the digital image can include the request identifier via a visual depiction of the user together with the request identifier, in similar fashion to the POI document. For example, the digital image can include a depiction of the user holding both the POI document and a sheet of paper that shows the request identifier, an attestation of the current date, and/or other information. In other embodiments, the request identifier can be included in the digital image via other means such as, for example, steganographic embedding or digital watermarking.

Figure 3D:
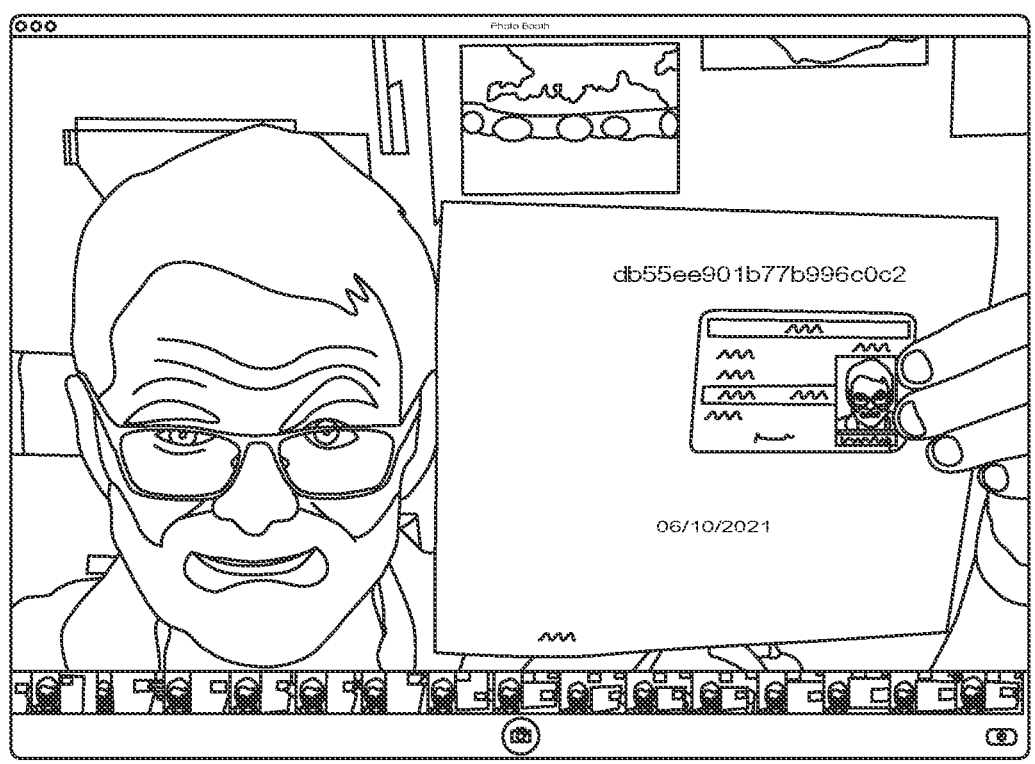
FIG. 3D illustrates an example of a digital image.

At block 212, the identity proof system 102 receives the digital image. FIG. 3D illustrates an example of the digital image. In the example of FIG. 3D, the digital image depicts the user holding the POI document and a sheet of paper that shows an attestation of the current date and the request identifier.

At block 214, the identity proof system 102 validates information in the digital image. In various embodiments, the block 214 can involve performing, or causing to be performed, any of the validation technologies described previously, such as OCR, facial recognition, liveness detection, database checks, "selfie" with POI and proof of date and/or the like.

At decision block 216, the identity proof system 102 determines whether the validation is successful. If not, the process 200 may end without an identity proof being generated. Otherwise, if it is determined at the decision block 216 that the validation is successful, the process 200 proceeds to block 218.

At block 218, the identity proof system 102 creates a POI digital document that includes at least a portion of the digital image from the block 212. In some embodiments, the POI digital document is created from the digital image. In certain embodiments, the block 218 can further involve digitally signing the request identifier and embedding the digitally signed request identifier into the POI digital document. In these embodiments, the request identifier can be digitally signed using a private key of the identity proof system 102, such that the digital signature can be verified using a public key of the identity proof system 102.

At block 219, the identity proof system 102 generates a second blockchain anchor using the POI digital document from the block 218. The second blockchain anchor can represent, and/or attest to, at least a portion of the POI digital document from the block 218 and/or other data or metadata related to the POI request, such as any of the data described relative to the block 205. In similar fashion to the first blockchain anchor, the second blockchain anchor can be a cryptographic hash that is generated using SHA256 or another suitable hashing algorithm.

Still with reference to the block 219, in some cases, the cryptographic hash can result from hashing a second configurable identity dataset. The second configurable identity dataset can include, for example, at least a portion of the POI digital document from the block 218, along with any other data or metadata related to the POI request. In other cases, additional hashing can be performed to generate the cryptographic hash. For example, the cryptographic hash can be a root of a Merkle tree, thereby resulting from a sequence of hashes. Example embodiments involving Merkle trees will be described in greater detail relative to FIGS. 4A, 4B, and 5.

At block 220, the identity proof system 102 stores the second blockchain anchor on the public blockchain in a second blockchain transaction. For example, if the second blockchain anchor is a cryptographic hash as described relative to the block 219, the block 220 can include storing that cryptographic hash on the public blockchain. The public blockchain can be, for example, the public blockchain 106B of FIG. 1B.

Figure 3E:
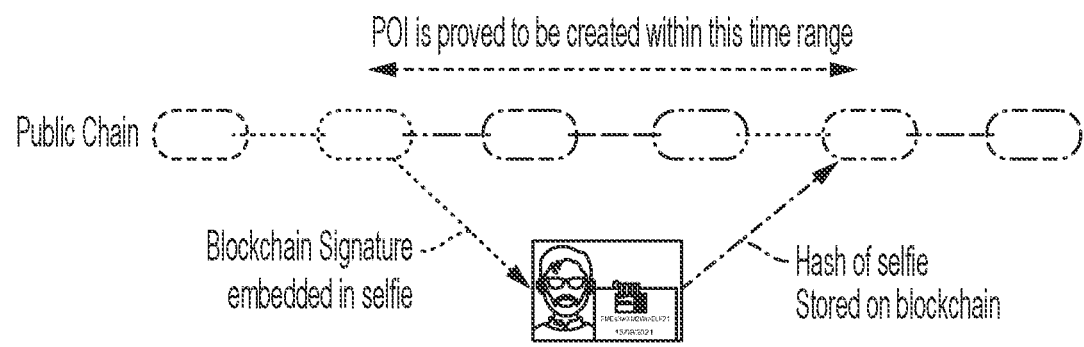
FIG. 3E illustrates an example of POI digital document creation being bounded by the times of two blockchain transactions.

Still with reference to the block 220, in a typical embodiment, because of the first and second blockchain transactions described above relative to the blocks 206 and 220, respectively, the POI request is anchored in two places on the public blockchain. In addition, in some embodiments, data or metadata associated with the POI request are also represented in the first and second anchors (e.g., via hashes or sequences of hashes), thereby preventing the POI digital document from being misused in other contexts (e.g., preventing any attempt to claim the POI digital document relates to a different date or person). In this way, a time of the first blockchain transaction (e.g., a date or timestamp) represents the earliest possible time or date at which the POI digital document could have been created. Similarly, a time of the second blockchain transaction (e.g., a date or timestamp) represents the last possible date at which the POI digital document could have been created. In other words, as shown in FIG. 3E, it can be proven that the POI digital document was created within a time range that is bounded by the times of the first and second blockchain transactions.

Figure 3F:
FIG. 3F illustrates an example identity proof.

At block 222, the identity proof system 102 generates an identity proof that certifies creation of the POI digital document between the time of the first blockchain transaction and the time of the second blockchain transaction. FIG. 3F illustrates an example identity proof in conjunction with the example digital image from FIG. 3D. In some embodiments, the identity proof can be, or can include, a human-readable certificate that explains cryptographic techniques involved and includes binary representations of such proofs.

In some embodiments, the block 222 can include creating a uniform resource locator (URL), such as a permanent URL, and associating the URL with the identity proof. In these embodiments, the URL can be used to share the identity proof and/or documents related thereto, such as the POI digital document. The URL allows owners, for example, to share the identity proof and/or documents related thereto, such as the POI digital document, with other parties. In various embodiments, the URL translates to a page that shows the identity proof and/or documents related thereto, such as the POI digital document, and their cryptographic proofs.

In some embodiments, the block 222 can include the identity proof system 102 creating, or minting, a non-fungible token (NFT) associated with the POI request. If created, the NFT can be transferred to a nominated cryptocurrency account of an individual requesting such proof. In a typical embodiment, the NFT is associated with metadata that connects it to the identity proof system 102 and to the blockchain transactions that establish the proof of identity. In various embodiments, the NFT serves two purposes. First, because it is minted by the identity proof system 102, it serves as additional confirmation that the POI digital document was created by the identity proof system 102. Second, because the NFT is transferred to individual's account, the NFT provides proof of ownership. As a result, the individual in possession of the NFT can legitimately assert ownership of the POI digital document and/or related artifacts.

At block 224, the identity proof system 102 stores identity proof data. In general, the block 224 can include the database service 112 of FIG. 1B, for example, storing any data received, generated, or used during the process 200. The stored identity proof data can include, for example, raw information, documents, and images received from the user, stenographic and/or watermarked versions of these documents, the created POI digital document, hashed and/or digitally signed representations of any of the foregoing, the first and second anchors, the generated identity proof, combinations of the same, and/or the like. In some cases, as described in greater detail below relative to FIGS. 4A, 4B, and 5, the stored identity proof data can include Merkle path information for the first and second anchors.

In certain embodiments, the identity proof data is stored and can be retrieved in an archive format that encapsulates the cryptographic proof information together with POI documents and data and/or metadata. This archive can include, for example, raw information, documents, and images received from the user, stenographic and/or watermarked versions of these documents, the created POI digital document, hashed and/or digitally signed representations of any of the foregoing (e.g., signed with a private key of the identity proof system 102), the first and second anchors, metadata (e.g., in JSON format), Merkle trees and/or Merkle paths associating all elements with their ultimate blockchain transaction identifiers, a human-readable certificate explaining the cryptographic techniques involved and which also includes binary representations of these proofs, combinations of the foregoing and/or the like. Merkle trees and paths can be provided, for example, in Chainpoint format such that Merkle proofs can be independently verified using Chainpoint APIs. After block 224, the process 200 ends.

FIG. 4 illustrates an example of a Merkle tree 426 that can be utilized in some embodiments. The Merkle tree 426 is a data structure that, in some embodiments, can be used within a blockchain to anchor multiple elements in one block to a single "signature" in a succeeding block. The Merkle tree 426 has a root node 432. For simplicity of description, nodes of Merkle trees may be periodically referenced herein by the hashes they contain (e.g., leaf hash, root hash, etc.).

With reference to the process 200 of FIG. 2 described above, in some embodiments, the first and second anchors that are stored on the public blockchain can each be a root hash of a Merkle tree. For example, in the Merkle tree 426 shown in FIG. 4, multiple elements, such as documents or other data, are hashed, and the hash of each element is placed in leaf nodes 428 of the Merkle tree 426. Pairs of the leaf nodes 428 are hashed, and then pairs of those hashes are hashed, and so on until only the root node 432 remains. The root node 432 can be used to prove any or all of the elements concerned.

Although it might be unwieldy if the entire Merkle tree 426 were required to prove an individual element represented in the leaf nodes 428, in various embodiments, an element, such as a document, can be proved by supplying only a Merkle path, where the Merkle path is defined by the sequence of hash pairs that connect a given leaf hash representing that element with the root hash. For example, with reference to the leaf node 428a, a Merkle path would include leaf nodes 428A and 428B and intermediate nodes 430A and 430B. In this way, the identity proof data that is stored at the block 224 of FIG. 2 can include Merkle path information for each node that is to be individually provable, such as for all the leaf nodes. The Merkle path information can include, for example, for each leaf node, the sequence of hash pairs that connect the leaf node with the root node.

In various embodiments, the identity proof system 102 described above can use Merkle trees such as the Merkle tree 426 in at least two ways. First, Merkle trees can be constructed from individual elements, such as from all of the data or metadata, created POI digital documents, and/or the images and POI documents received from users. This Merkle tree can be used to prove the integrity of all of the elements in combination or of any individual element. For instance, a Merkle path can be used to prove the integrity of just a POI digital document independently of its metadata while allowing for POI digital documents to be validated in new contexts (such as for a new POI request with a different home address, etc.). In certain embodiments, a change to metadata does not completely invalidate all of the POI digital documents and data. Changes to metadata can be noted while still preserving the integrity of proofs as to unchanged metadata.

In various embodiments, Merkle trees can also be used to aggregate data related to multiple POI requests into a single blockchain transaction. For some blockchains (e.g., Ethereum), the cost of a transaction can vary significantly from time to time. A solution that required a blockchain transaction for each POI request could be uneconomical in some cases. Therefore, in certain embodiments, the identity proof system 102 aggregates multiple POI requests into a single blockchain transaction. Any POI request can aggregate multiple POI documents and metadata elements into a single POI hash which are then aggregated into a batch Merkle tree, thereby creating a final root hash that is inserted onto the public blockchain. The batch root hash can therefore prove hundreds or thousands of POI requests, for example.

FIG. 4B illustrates an example of identity proof data that includes Merkle path information. The example of FIG. 4B is in Chainpoint format as described previously.

Figure 5:
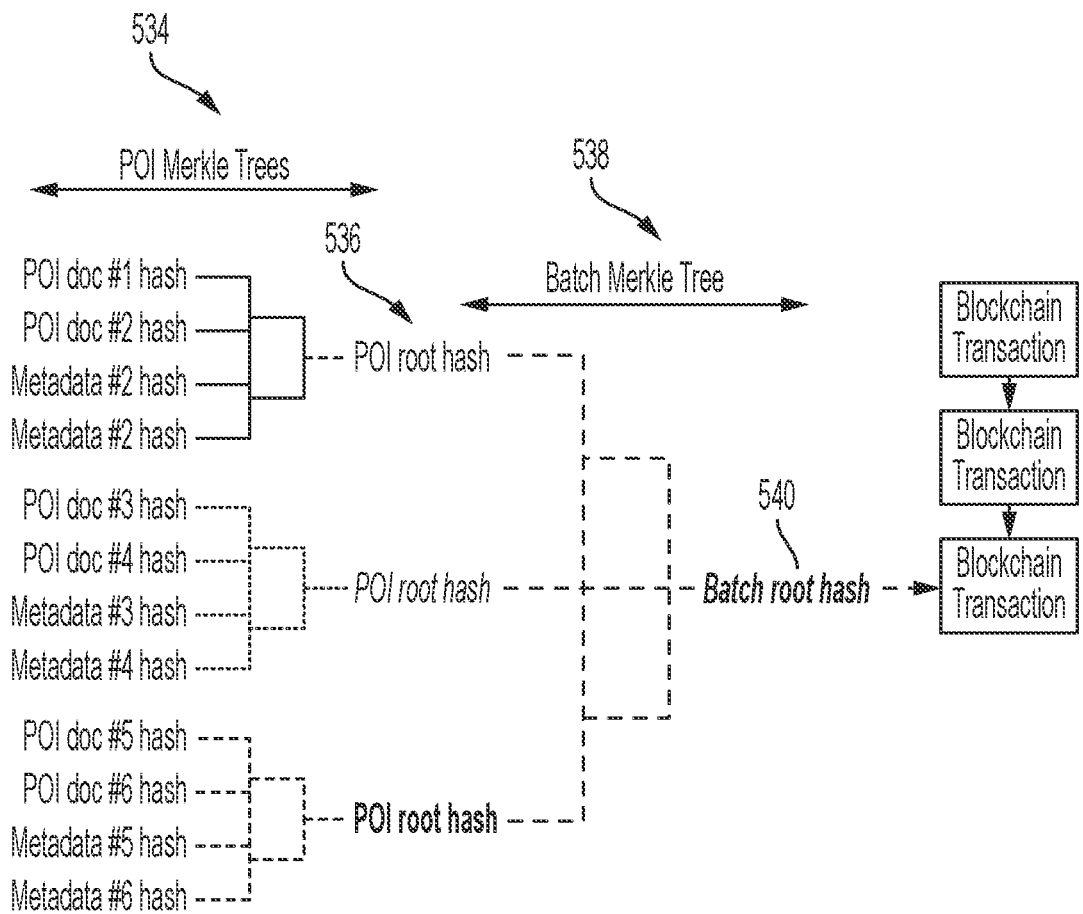
FIG. 5 illustrates an example of a batch Merkle tree.

FIG. 5 illustrates an example of a batch Merkle tree 538. The batch Merkle tree 538 is constructed from POI Merkle trees 534. The POI Merkle trees 534 can each be constructed from individual elements, such as documents or other data or metadata, for a given POI request. Advantageously, in certain embodiments, the POI Merkle trees 534 can relate to different POI requests and different users, although that need not always be the case. For illustrative purposes, the POI Merkle trees 534 are shown to be three in number, but it should be appreciated that the POI Merkle trees 534 can include any suitable number of POI Merkle trees, such as many hundreds or thousands. The POI Merkle trees 534 have POI root hashes 536, one for each of the POI Merkle trees therein. The POI root hashes 536 can be created in similar fashion to the root node 432 described relative to FIG. 4.

The batch Merkle tree 538 is constructed by hashing the POI root hashes 536, thereby resulting in a batch root hash 540. With reference to the process 200 of FIG. 2 described above, in some embodiments, the first and second anchors that are stored on the public blockchain can each be a root hash of a batch Merkle tree similar to the batch root hash 540 of the batch Merkle tree 538. A single blockchain transaction can thus serve an anchoring function for multiple POI requests for multiple users. In this way, the identity proof data that is stored at the block 224 of FIG. 2 can include Merkle path information for each node that is to be individually provable, such as for all the leaf nodes. The Merkle path information can include, for example, for each leaf node, the sequence of hashes that connect the leaf node with the root node.

Figure 6:
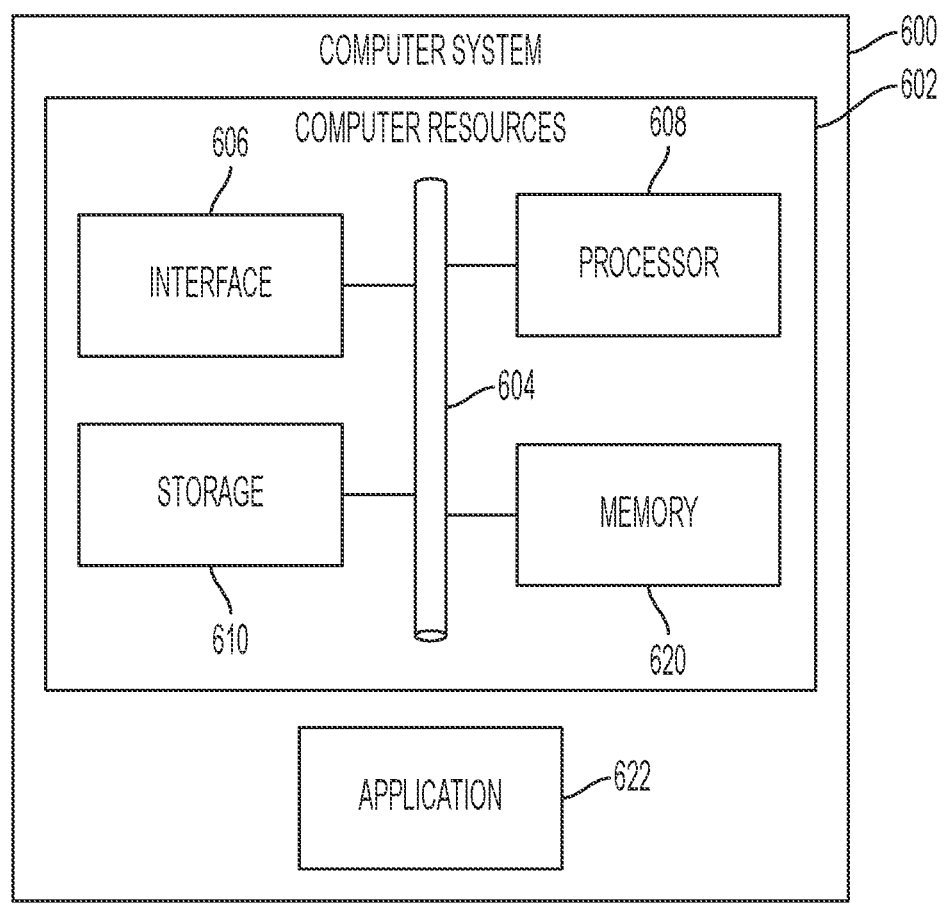
FIG. 6 illustrates an example of a computer system.

FIG. 6 illustrates an example of a computer system 600 that, in some cases, can be representative, for example, of the identity proof system 102 and/or a module or sub-component of the foregoing. The computer system 600 includes an application 622 operable to execute on computer resources 602. The application 622 can be, for example, any of the systems or modules illustrated in FIG. 1A or 1B. In particular embodiments, the computer system 600 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 600 may comprise any suitable physical form, configuration, number, type and/or layout. As an example, and not by way of limitation, the computer system 600 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 600 may include one or more computer systems; be unitary or distributed; span multiple locations; span multiple machines; or reside in a cloud, which may include one or more cloud components in one or more networks.

In the depicted embodiment, the computer system 600 includes a processor 608, memory 620, storage 610, interface 606, and bus 604. Although a particular computer system is depicted having a particular number of particular components in a particular arrangement, this disclosure contemplates any suitable computer system having any suitable number of any suitable components in any suitable arrangement.

Processor 608 may be a microprocessor, controller, or any other suitable computing device, resource, or combination of hardware, software and/or encoded logic operable to execute, either alone or in conjunction with other components, (e.g., memory 620), the application 622. Such functionality may include providing various features discussed herein. In particular embodiments, processor 608 may include hardware for executing instructions, such as those making up the application 622. As an example, and not by way of limitation, to execute instructions, processor 608 may retrieve (or fetch) instructions from an internal register, an internal cache, memory 620, or storage 610; decode and execute them; and then write one or more results to an internal register, an internal cache, memory 620, or storage 610.

In particular embodiments, processor 608 may include one or more internal caches for data, instructions, or addresses. This disclosure contemplates processor 608 including any suitable number of any suitable internal caches, where appropriate. As an example, and not by way of limitation, processor 608 may include one or more instruction caches, one or more data caches, and one or more translation lookaside buffers (TLBs). Instructions in the instruction caches may be copies of instructions in memory 620 or storage 610 and the instruction caches may speed up retrieval of those instructions by processor 608. Data in the data caches may be copies of data in memory 620 or storage 610 for instructions executing at processor 608 to operate on; the results of previous instructions executed at processor 608 for access by subsequent instructions executing at processor 608, or for writing to memory 620, or storage 610; or other suitable data. The data caches may speed up read or write operations by processor 608. The TLBs may speed up virtual-address translations for processor 608. In particular embodiments, processor 608 may include one or more internal registers for data, instructions, or addresses. Depending on the embodiment, processor 608 may include any suitable number of any suitable internal registers, where appropriate. Where appropriate, processor 608 may include one or more arithmetic logic units (ALUs); be a multi-core processor; include one or more processors 608; or any other suitable processor.

Memory 620 may be any form of volatile or non-volatile memory including, without limitation, magnetic media, optical media, random access memory (RAM), read-only memory (ROM), flash memory, removable media, or any other suitable local or remote memory component or components. In particular embodiments, memory 620 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 620 may include one or more memories 620, where appropriate. Memory 620 may store any suitable data or information utilized by the computer system 600, including software embedded in a computer readable medium, and/or encoded logic incorporated in hardware or otherwise stored (e.g., firmware). In particular embodiments, memory 620 may include main memory for storing instructions for processor 608 to execute or data for processor 608 to operate on. In particular embodiments, one or more memory management units (MMUs) may reside between processor 608 and memory 620 and facilitate accesses to memory 620 requested by processor 608.

As an example, and not by way of limitation, the computer system 600 may load instructions from storage 610 or another source (such as, for example, another computer system) to memory 620. Processor 608 may then load the instructions from memory 620 to an internal register or internal cache. To execute the instructions, processor 608 may retrieve the instructions from the internal register or internal cache and decode them. During or after execution of the instructions, processor 608 may write one or more results (which may be intermediate or final results) to the internal register or internal cache. Processor 608 may then write one or more of those results to memory 620. In particular embodiments, processor 608 may execute only instructions in one or more internal registers or internal caches or in memory 620 (as opposed to storage 610 or elsewhere) and may operate only on data in one or more internal registers or internal caches or in memory 620 (as opposed to storage 610 or elsewhere).

In particular embodiments, storage 610 may include mass storage for data or instructions. As an example, and not by way of limitation, storage 610 may include a hard disk drive (HDD), a floppy disk drive, flash memory, an optical disc, a magneto-optical disc, magnetic tape, or a Universal Serial Bus (USB) drive or a combination of two or more of these. Storage 610 may include removable or non-removable (or fixed) media, where appropriate. Storage 610 may be internal or external to the computer system 600, where appropriate. In particular embodiments, storage 610 may be non-volatile, solid-state memory. In particular embodiments, storage 610 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 610 may take any suitable physical form and may comprise any suitable number or type of storage. Storage 610 may include one or more storage control units facilitating communication between processor 608 and storage 610, where appropriate.

In particular embodiments, interface 606 may include hardware, encoded software, or both providing one or more interfaces for communication (such as, for example, packet-based communication) among any networks, any network devices, and/or any other computer systems. As an example, and not by way of limitation, communication interface 606 may include a network interface controller (NIC) or network adapter for communicating with an Ethernet or other wire-based network and/or a wireless NIC (WNIC) or wireless adapter for communicating with a wireless network.

Depending on the embodiment, interface 606 may be any type of interface suitable for any type of network for which computer system 600 is used. As an example, and not by way of limitation, computer system 600 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 600 may include any suitable interface 606 for any one or more of these networks, where appropriate.

In some embodiments, interface 606 may include one or more interfaces for one or more I/O devices. One or more of these I/O devices may enable communication between a person and the computer system 600. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 606 for them. Where appropriate, interface 606 may include one or more drivers enabling processor 608 to drive one or more of these I/O devices. Interface 606 may include one or more interfaces 606, where appropriate.

Bus 604 may include any combination of hardware, software embedded in a computer readable medium, and/or encoded logic incorporated in hardware or otherwise stored (e.g., firmware) to couple components of the computer system 600 to each other. As an example, and not by way of limitation, bus 604 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 604 may include any number, type, and/or configuration of buses 604, where appropriate. In particular embodiments, one or more buses 604 (which may each include an address bus and a data bus) may couple processor 608 to memory 620. Bus 604 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 608 (such as, for example, one or more internal registers or caches), one or more portions of memory 620, one or more portions of storage 610, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of blockchain-enhanced proof of identity (POI), the method comprising, by a computer system:
   receiving identity information of a user in connection with a POI request;
   obtaining an identifier for a first blockchain transaction on a first blockchain or for a block of the first blockchain comprising such a first blockchain transaction;
   establishing a request identifier for the POI request based on the identifier for the first blockchain transaction on a first blockchain or for a block of the first blockchain comprising the first blockchain transaction;
   receiving an anchored credential of the user, wherein the anchored credential is a function of the request identifier and provides verifiable proof of the identity of the user;
   creating a POI digital document comprising at least a portion of the anchored credential; and
   storing a representation of the POI digital document on a second blockchain in a second blockchain transaction.

2. The method of claim 1, wherein the first blockchain and the second blockchain are public blockchains.

3. The method of claim 1, wherein the first blockchain and the second blockchain are the same blockchain.

4. The method of claim 1, wherein the first blockchain and the second blockchain are different blockchains.

5. The method of claim 1, wherein said first blockchain transaction is an existing transaction on said first blockchain.

6. The method of claim 1, further comprising adding said first blockchain transaction to said first blockchain.

7. The method of claim 6, wherein adding said first blockchain transaction to said first blockchain includes storing a first set of data on the first blockchain in said first blockchain transaction.

8. The method of claim 7, wherein said first set of data includes data related to or comprising a portion of the identity information.

9. The method of claim 7, further comprising generating a first cryptographic hash using at least a portion of the identity information and wherein said first set of data includes the first cryptographic hash.

10. The method of claim 1, wherein obtaining an identifier of a first blockchain transaction on a first blockchain or of a block of the first blockchain comprising such a first blockchain transaction is done in a way such that the probability that another blockchain transaction or another block has the same identifier value is less than a given threshold.

11. The method of claim 1, wherein the identifier is unique for different blockchain transactions or for different blockchain blocks and the probability that another blockchain transaction or another block has the same identifier value is zero.

12. The method of claim 1, wherein the value of the identifier of a first blockchain transaction on a first blockchain or of a block of the first blockchain comprising such a first blockchain transaction is unpredictable before the first blockchain transaction is stored on the first blockchain or before the block of the first blockchain comprising the first blockchain transaction is created or added to the first blockchain.

13. The method of claim 1, further comprising validating the anchored credential.

14. The method of claim 13, wherein the creating a POI digital document comprising at least a portion of the anchored credential or the storing a representation of the POI digital document on a second blockchain in a second blockchain transaction is responsive to said validating of the anchored credential being successful.

15. The method of claim 13, wherein the POI digital document further comprises data representative of a result of said validating the anchored credential.

16. The method of claim 1, wherein storing a representation of the POI digital document on the second blockchain in a second blockchain transaction comprises generating a second cryptographic hash using at least a portion of the POI digital document and storing the second cryptographic hash on the second blockchain in the second blockchain transaction.

17. The method of claim 1, wherein the anchored credential is a function of the request identifier in such a way that it is hard to generate, without cooperation of the user, an anchored credential for a given value of the request identifier that can be validated successfully.

18. The method of claim 1, wherein the anchored credential comprises a digital visual representation of the user together with a POI document and a representation of the request identifier.

19. The method of claim 18, wherein the anchored credential comprises a digital movie of the user holding the POI document and holding a visual representation of the request identifier or reading out a representation of the request identifier.

20. The method of claim 18, further comprising validating the anchored credential wherein said validating the anchored credential comprises at least one of the following:
  extracting from the anchored credential a picture of the user on the POI document and comparing the extracted picture of the user with the digital visual representation of the user in the anchored credential;
  extracting a request identifier test value from the representation of the request identifier in the anchored credential and comparing the extracted request identifier test value with a value of the request identifier established in the establishing a request identifier for the POI request based on an identifier for the first blockchain transaction;
  extracting a second set of identity information from the POI document in said digital visual representation of the user together with a POI document and comparing the extracted second set of identity information with the identity information received in the receiving identity information of a user in connection with a POI request; and
  a liveness detection of said digital visual representation of the user together with a POI document and a representation of the request identifier.

21. The method of claim 18, further comprising presenting the user with the request identifier; and wherein the digital visual representation includes the request identifier via depiction of the user together with the request identifier and the POI document.

22. The method of any of claim 1, wherein the anchored credential comprises a digital image that depicts the user together with a POI document, the digital image further including the request identifier.

23. The method of any of claim 1, wherein the anchored credential comprises a digital image of the user holding the POI document and holding a visual representation of the request identifier.

24. The method of claim 18, wherein the digital visual representation includes the request identifier via steganographic embedding thereof.

25. The method of claim 1, wherein the anchored credential comprises a digital signature of the request identifier wherein the digital signature is created using a secret or private key linked to or controlled by the user.

26. The method of claim 25, wherein the secret or private key linked to or controlled by the user comprises a private key of a public/private key pair whereby a public key of that public/private key pair is certified by a certificate that links the public key to identity information of the user.

27. The method of claim 1, further comprising generating an identity proof that certifies creation of the POI digital document between a time of the first blockchain transaction and a time of the second blockchain transaction.

28. The method of claim 27, further comprising associating a shareable uniform resource locator (URL) with the identity proof, wherein the shareable URL translates to a page that shows at least a portion of the identity proof.

29. The method of claim 27, further comprising creating a non-fungible token (NFT) associated with the POI request and transferring the NFT to a cryptocurrency account of an individual requesting the identity proof.

30. The method of claim 1, wherein the creating the POI digital document comprises digitally signing the request identifier and embedding the digitally signed request identifier into the POI digital document.

31. The method of claim 1, further comprising at least one of the following:
  generating a first cryptographic hash using at least a portion of the identity information and storing the first cryptographic hash on the first blockchain in the first blockchain transaction; and
  generating a second cryptographic hash using at least a portion of the POI digital document and storing the second cryptographic hash on the second blockchain in the second blockchain transaction.

32. The method of claim 31, further comprising at least one of the following:
  wherein the generating the first cryptographic hash comprises hashing a first identity dataset comprising at least a portion of the identity information, the stored first cryptographic hash comprising the hashed first identity dataset; or
  wherein the generating the second cryptographic hash comprises hashing a second identity dataset comprising the at least a portion of the POI digital document, the stored second cryptographic hash comprising the hashed second identity dataset.

33. The method of claim 31, wherein:
  the generating the first cryptographic hash comprises hashing a first identity dataset comprising at least a portion of the identity information, and constructing a first Merkle tree at least partly from the hashed first identity dataset, the stored first cryptographic hash comprising a root hash of the first Merkle tree; or
  the generating the second cryptographic hash comprises hashing a second identity dataset comprising the at least a portion of the POI digital document, and constructing a second Merkle tree at least partly from the hashed second identity dataset, the stored second cryptographic hash comprising a root hash of the second Merkle tree.

34. The method of claim 33, further comprising at least one of the following:
wherein the first Merkle tree comprises a first batch Merkle tree, the constructing the first Merkle tree comprising hashing data related to multiple POI requests; and
wherein the second Merkle tree comprises a second batch Merkle tree, the constructing the second Merkle tree comprising hashing data related to multiple POI requests.

35. The method of claim 33, further comprising at least one of the following:
storing first Merkle path information for at least one node of the first Merkle tree, the first Merkle path information comprising information related to a sequence of hashes that connect the at least one node with the root hash of the first Merkle tree; and,
storing second Merkle path information for at least one node of the second Merkle tree, the Merkle path information comprising information related to a sequence of hashes that connect the at least one node with the root hash of the second Merkle tree.

36. The method of claim 1 wherein the request identifier comprises at least a portion of the identifier for the first blockchain transaction on the first blockchain or for a block of the first blockchain comprising the first blockchain transaction.

37. A computer system comprising a processor, persistent storage and memory, which in combination are operable to implement a method of blockchain-enhanced proof of identity (POI), the method of blockchain-enhanced proof of identity (POI) comprising the method of claim 1.

38. The computer system of claim 37, wherein the method comprises:
receiving identity information of a user in connection with a POI request; generating a first cryptographic hash using at least a portion of the identity information;
storing the first cryptographic hash on a public blockchain in a first blockchain transaction; establishing a request identifier for the POI request based on an identifier for the first blockchain transaction;
receiving a digital image that depicts the user together with a POI document, the digital image including the request identifier;
responsive to successful validation of at least selected information in the digital image, creating a POI digital document comprising at least a portion of the digital image;
generating a second cryptographic hash using at least a portion of the POI digital document; and
storing the second cryptographic hash on the public blockchain in a second blockchain transaction.

39. The computer system of claim 37, wherein the computer system is a distributed computer system that is implemented via a plurality of services.

40. The computer system of claim 38, wherein the method further comprises generating an identity proof that certifies creation of the POI digital document between a time of the first blockchain transaction and a time of the second blockchain transaction.

41. The computer system of claim 38, wherein the creating the POI digital document comprises: digitally signing the request identifier; and embedding the digitally signed request identifier into the POI digital document.

42. The computer system of claim 38, further comprising at least one of the following:
wherein the generating the first cryptographic hash comprises hashing a first identity dataset comprising at least a portion of the identity information, the stored first cryptographic hash comprising the hashed first identity dataset; and
wherein the generating the second cryptographic hash comprises hashing a second identity dataset comprising the at least a portion of the POI digital document, the stored second cryptographic hash comprising the hashed second identity dataset.

43. The computer system of claim 38, further comprising at least one of the following:
wherein the generating the first cryptographic hash comprises: hashing a first identity dataset comprising at least a portion of the identity information, and constructing a first Merkle tree at least partly from the hashed first identity dataset, the stored first cryptographic hash comprising a root hash of the first Merkle tree; and
wherein the generating the second cryptographic hash comprises hashing a second identity dataset comprising the at least a portion of the POI digital document, and constructing a second Merkle tree at least partly from the hashed second identity dataset, the stored second cryptographic hash comprising a root hash of the second Merkle tree.

44. The computer system of claim 43, the method comprising:
wherein the first Merkle tree is a first batch Merkle tree, the constructing the first Merkle tree comprising hashing data related to multiple POI requests;
wherein the second Merkle tree is a second batch Merkle tree, the constructing the second Merkle tree comprising hashing data related to multiple POI requests;
storing first Merkle path information for at least one node of the first Merkle tree, the first Merkle path information comprising information related to a sequence of hashes that connect the at least one node with the root hash of the first Merkle tree; and
storing second Merkle path information for at least one node of the second Merkle tree, the Merkle path information comprising information related to a sequence of hashes that connect the at least one node with the root hash of the second Merkle tree.

45. A computer-program product comprising a non-transitory computer-usable medium having computer-readable program code embodied therein, the computer-readable program code adapted to be executed to implement a method of blockchain-enhanced proof of identity (POI), the method comprising:
receiving identity information of a user in connection with a POI request;
generating a first cryptographic hash using at least a portion of the identity information;
storing the first cryptographic hash on a public blockchain in a first blockchain transaction;
establishing a request identifier for the POI request based on an identifier for the first blockchain transaction;
receiving a digital image that depicts the user together with a POI document, the digital image including the request identifier;
responsive to successful validation of at least selected information in the digital image, creating a POI digital document comprising at least a portion of the digital image;

generating a second cryptographic hash using at least a portion of the POI digital document; and storing the second cryptographic hash on the public blockchain in a second blockchain transaction.

\* \* \* \* \*